(12) United States Patent
Lan

(10) Patent No.: US 11,745,365 B2
(45) Date of Patent: Sep. 5, 2023

(54) 3-AXIS PARALLEL LINEAR ROBOT

(71) Applicant: NATIONAL CHENG KUNG UNIVERSITY, Tainan (TW)

(72) Inventor: Chao-Chieh Lan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 126 days.

(21) Appl. No.: 17/138,266

(22) Filed: Dec. 30, 2020

(65) Prior Publication Data

US 2021/0299890 A1    Sep. 30, 2021

(30) Foreign Application Priority Data

Mar. 27, 2020  (TW) .................................. 109110614

(51) Int. Cl.
*B25J 17/02*    (2006.01)

(52) U.S. Cl.
CPC ................................ *B25J 17/0283* (2013.01)

(58) Field of Classification Search
CPC .... B25J 9/0048; B25J 9/1065; B25J 17/0283; B25J 17/0866; B25J 9/0051; B25J 9/0045; B25J 9/003
See application file for complete search history.

(56) References Cited

U.S. PATENT DOCUMENTS

| | | | |
|---|---|---|---|
| 4,976,582 A | | 12/1990 | Demaurex |
| 5,699,695 A | * | 12/1997 | Canfield .............. B25J 17/0266 901/29 |
| 6,729,202 B2 | | 5/2004 | Gosselin et al. |
| 7,472,622 B2 | * | 1/2009 | Isobe ................... B25J 17/0266 901/29 |
| 7,478,576 B2 | * | 1/2009 | Rosheim .............. B25J 17/0266 901/29 |
| 9,808,932 B2 | * | 11/2017 | Nishio ........................ B25J 9/06 |
| 10,022,827 B2 | * | 7/2018 | Isobe ..................... B25J 9/0048 |
| 10,406,677 B2 | * | 9/2019 | Isobe ........................ F16H 21/46 |
| 10,513,028 B2 | * | 12/2019 | Isobe ........................ B25J 9/046 |
| 11,230,018 B2 | * | 1/2022 | Hongo ................... B25J 9/0045 |

(Continued)

FOREIGN PATENT DOCUMENTS

| | | |
|---|---|---|
| CN | 105150199 | 12/2015 |
| CN | 105150199 A | 12/2015 |

(Continued)

*Primary Examiner* — Gregory Robert Weber
(74) *Attorney, Agent, or Firm* — Sinorica LLC

(57) ABSTRACT

A 3-axis parallel linear robot has three drivers disposed around a central axis and a movement mechanism. The movement mechanism has three linkage assemblies connected to an end effector in parallel. The three assemblies are respectively driven by the three drivers in a linear or rotary manner for enabling the end effector to linearly move in a three-dimensional space. Each linkage assembly has three linkage rods and three rotating joints. An inner angle defined between each rotating joint and an imaginary plane being perpendicular to the central axis is an acute angle. A first center distance between the first rotating joint and the second rotating joint is equal to a second center distance between the second rotating joint and the third rotating joint. The overall height of the movement mechanism is reduced for increasing the working stroke and for improving the movement stability of the 3-axis parallel linear robot.

3 Claims, 16 Drawing Sheets

(56) References Cited

U.S. PATENT DOCUMENTS

| | | | | |
|---|---|---|---|---|
| 2003/0121351 A1* | 7/2003 | Gosselin | ............ | B25J 17/0266 |
| | | | | 901/15 |
| 2021/0388887 A1* | 12/2021 | Hayashi | ................. | F16H 21/46 |
| 2022/0143816 A1* | 5/2022 | Gosselin | ............ | F16M 11/043 |

FOREIGN PATENT DOCUMENTS

| | | |
|---|---|---|
| CN | 107139174 | 9/2017 |
| CN | 107139174 A | 9/2017 |
| JP | 2019155518 A | 9/2019 |
| KR | 101401463 B1 | 5/2014 |

\* cited by examiner

3-AXIS PARALLEL LINEAR ROBOT

This patent application claims the benefit of Taiwan patent application No. 109110614, filed on Mar. 27, 2020, the entire content of which is incorporated herein by reference thereto.

BACKGROUND OF THE INVENTION

1. Field of the Invention

The present invention relates to a 3-axis linear robot, and more particularly to a 3-axis parallel linear robot that can be widely used in robots and devices in other automated machinery fields.

2. Description of Related Art

Conventional 3-axis parallel linear robots have been disclosed in U.S. Pat. No. 4,976,582 (Device for movement and positioning of an element in space), U.S. Pat. No. 6,729,202 (Cartesian parallel manipulators), and CN Patent Pub. No. 105150199 A (Structure-adjustable three-freedom-degree parallel mechanism). The descriptions of the aforementioned 3-axis parallel linear robots are as follows.

The device for movement and positioning of an element in space in U.S. Pat. No. 4,976,582, generally referred to as a Delta robot, has three linkage means connected to an end effector together, and the end effector is used as an output end. Each one of the three linkage means is driven by a drive assembly and is composed by four parallel bars and two rotating joints, so that the end effector can be actuated with three-axis linear motion (XYZ).

The Delta robot that is disclosed in U.S. Pat. No. 4,976,582 has anticipated the use of three linkage means consisting of four parallel bars and two rotating joints to connect the end effector, and based on the need of three-dimensional space movement, an overall length of the three linkage means is too long. In a certain space, a working stroke in a height direction of the Delta robot is short due to an overall volume of the Delta robot is restricted by the overall length of the three linkage means, and this limits an application scope of the Delta robot.

In addition, in the above-mentioned Delta robot, each linkage means is composed by four parallel bars and two rotating joints, and an overall length of the four parallel bars of each one of the three linkage means is long. The rigidity of each linkage means along the X-axis and Y-axis directions is poor, the end effector is driven by the three linkage means, and the end effector may be shaken when it moves, influencing the stability of the Delta robot. Furthermore, the Jacobian matrix of the vector analysis of motion of the Delta robot will be changed significantly with the position of the end effector, which causes the variability of relationship between speed and power transmission to be too large, and the design of motion control is more difficult.

The Cartesian parallel manipulators disclosed in U.S. Pat. No. 6,729,202 are a right angle type parallel robot having three linkage means respectively connected to three shafts arranged in parallel, and the three linkage means are connected to an end effector. Each one of the three linkage means has three linkage rods sequentially connected in series, and one of the three linkage rods can be moved up and down on one of the three shafts. Two adjacent ones of the three linkage rods are connected to each other by a pivot. The linkage rods in the distal ends of the three linkage means are connected to the end effector, and the three linkage means can be driven separately to drive the end effector to move in space.

Although the right angle type parallel robot can be used to provide a motion function similar to that of the Delta robot, the right angle type parallel robot does not propose a better mechanism design for its linkage means, and the overall length of the linkage means is still too long, and also has the problems of short working stroke and insufficient movement stability.

The structure-adjustable three-freedom-degree parallel mechanism disclosed in CN Patent Pub. No. 105150199 A has anticipated a fixed platform, a movable platform, and three branches. Each branch has an adjusting component, a column, a moving part, a rotating part, a linkage rod, and a spherical part. The adjusting component is composed by a sliding rail, a slide block, an inlaid strip, and screws. The sliding rail of the adjusting component is horizontally disposed on the fixed platform and is matched with a sliding groove formed in a lower portion of the slide block. The column is vertically disposed on the slide block, the moving part is connected to the column and the rotating part and has an axis perpendicular to an upper face of the fixed platform. The rotating part has an axis parallel with the upper face of the fixed platform. The linkage rod has an end connected between the rotating part and the spherical part and is disposed on the movable platform by the spherical part.

Although the structure-adjustable three-freedom-degree parallel mechanism can be used to provide a motion function similar to that of the Delta robot, the structure-adjustable three-freedom-degree parallel mechanism does not propose a better mechanism design for its linkage means, the linkage rods of the three branches that are connected to the rotating part and the spherical part between the movable platform and the column must extend straight down, and this may make the lengths of the linkage rods that are connected to the movable platform too long and may increase the overall height of the structure-adjustable three-freedom-degree parallel mechanism. Furthermore, a distance between the movable platform and an input drive end is long, and the structure-adjustable three-freedom-degree parallel mechanism also has the problems of short working stroke and insufficient movement stability.

Furthermore, another parallel robot has been disclosed in CN Patent Pub. No. 107139174 A (Plane parallel mechanism control device and method of double five-rod driving). The plane parallel mechanism control device has a plane parallel mechanism body and a control unit. The plane parallel mechanism body has a movable platform, a passive movement chain, and two planar five-bar mechanisms. Each one of the two planar five-bar mechanisms has two direct drive rotating machines, two driving shafts, and two follower shafts. The passive movement chain has a bearing assembly and two driven shafts. The control unit is electrically connected to a 3-axis acceleration sensor disposed on the movable platform and the direct drive rotating machines. The two planar five-bar mechanisms are used as an active movement chain and is actuated by the direct drive rotating machines.

Although the plane parallel mechanism body of the plane parallel mechanism control device can be controlled to drive the movable platform to move, the passive movement is combined with the two planar five-bar machines, and pivot axes of the driving shafts and the driven shafts are parallel with the axes of the two direct drive rotating machines. Then the movable platform only can be driven to move on a plane along a horizontal direction and cannot be driven to move in the three-dimensional space, and this may limit the application scope of the plane parallel mechanism control device. Additionally, the plane parallel mechanism body must use five movement chains and the overall structure of the plane parallel mechanism body is complicated.

To overcome the shortcomings, the present invention tends to provide a 3-axis parallel linear robot to mitigate the aforementioned problems.

SUMMARY OF THE INVENTION

The main objective of the invention is to provide a 3-axis parallel linear robot that can be widely used in robots and devices in other automated machinery fields.

A 3-axis parallel linear robot in accordance with the present invention has three drivers disposed around a central axis and a movement mechanism. The movement mechanism has three linkage assemblies connected to an end effector in parallel. The three linkage assemblies are respectively driven by the three drivers in a linear or rotary manner for enabling the end effector to linearly move in a three-dimensional space. Each linkage assembly has three linkage rods and three rotating joints. An inner angle defined between each rotating joint and an imaginary plane being perpendicular to the central axis is an acute angle. A first center distance between the first rotating joint and the second rotating joint is equal to a second center distance between the second rotating joint and the third rotating joint. The overall height of the movement mechanism is reduced for increasing the working stroke and for improving the movement stability of the 3-axis parallel linear robot.

Other objects, advantages and novel features of the invention will become more apparent from the following detailed description when taken in conjunction with the accompanying drawings.

DETAILED DESCRIPTION OF PREFERRED EMBODIMENTS

Figure 1:
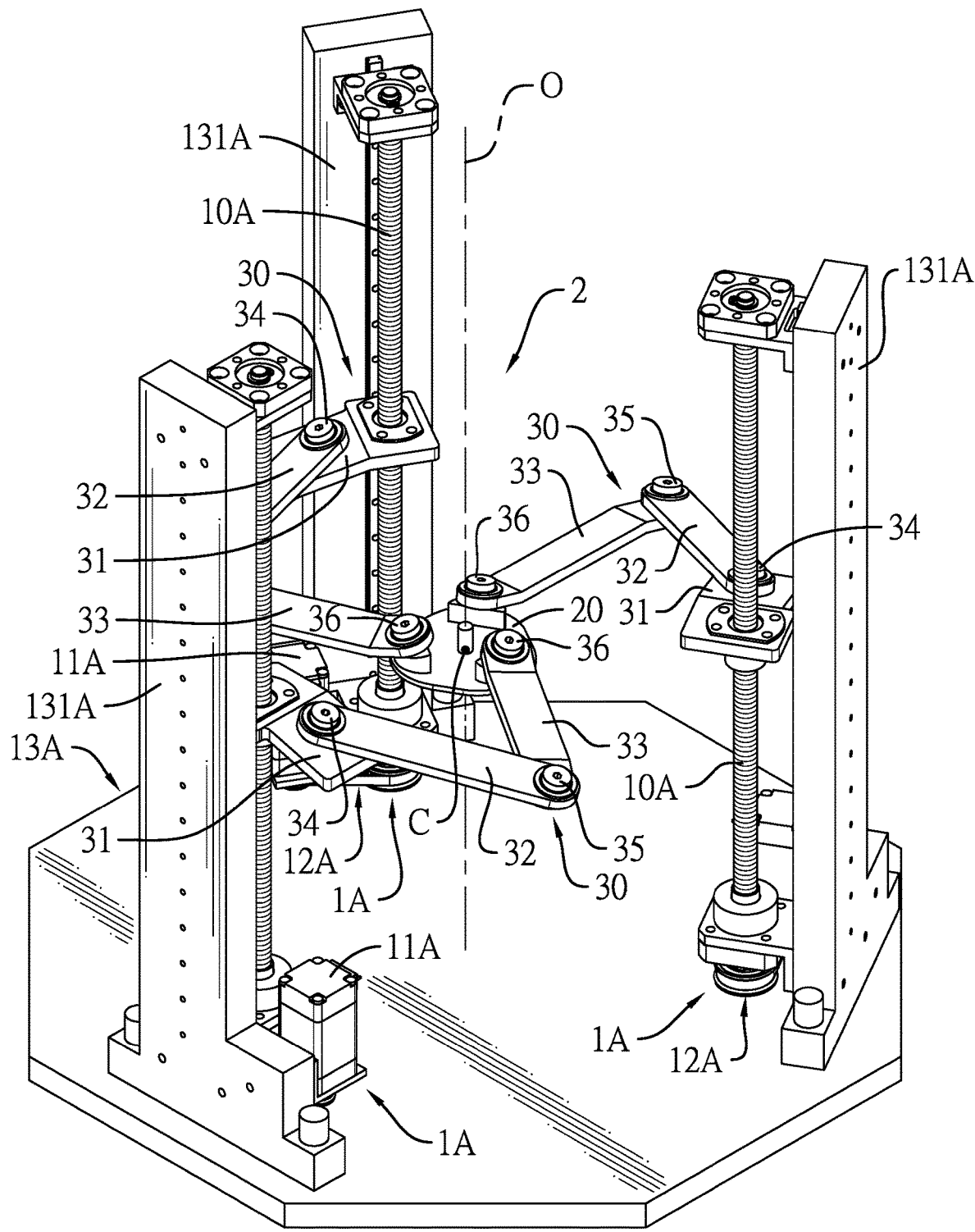
FIG. 1 is a perspective view of a first embodiment of a 3-axis parallel linear robot in accordance with the present invention.
Figure 2:
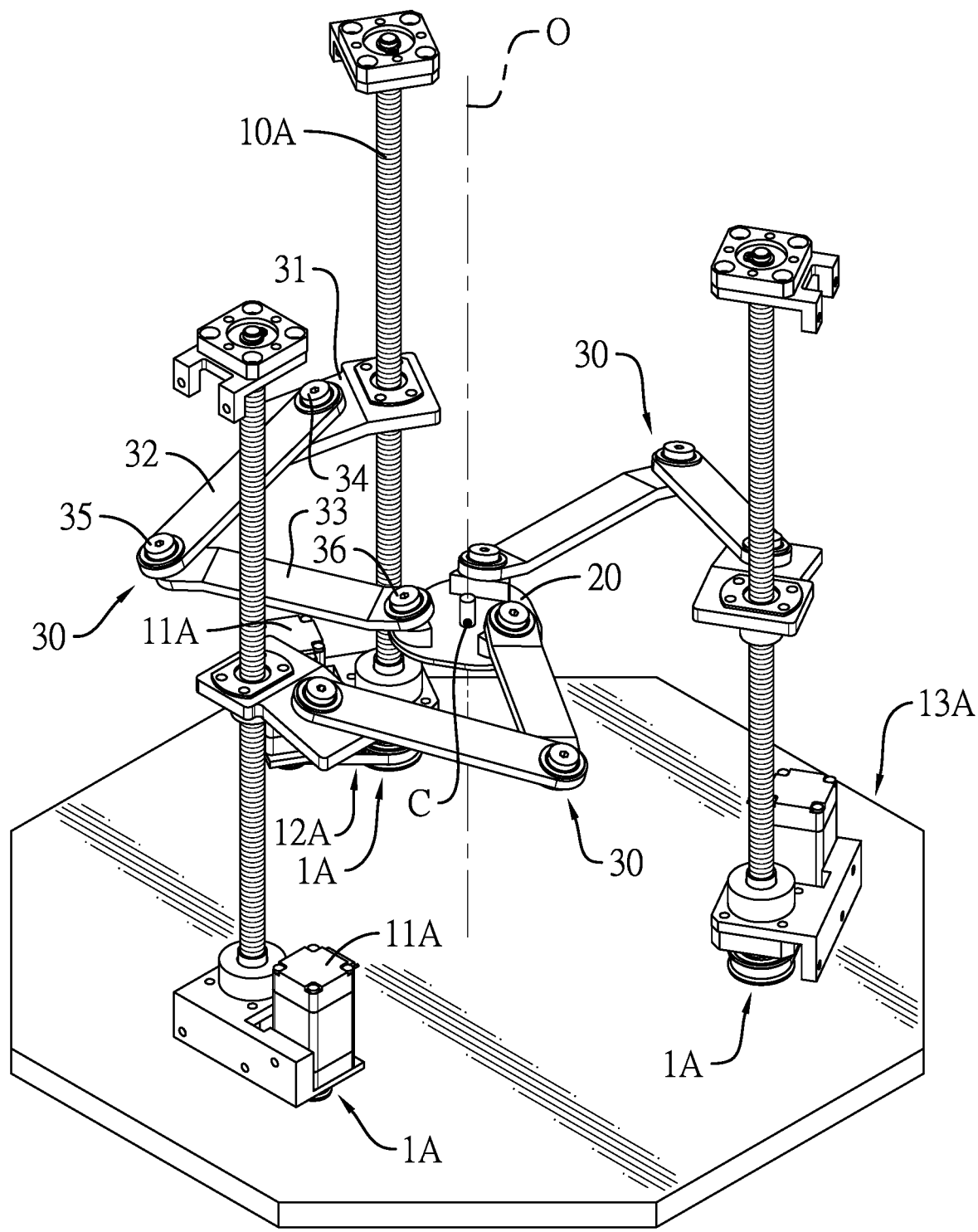
FIG. 2 is a perspective view of the 3-axis parallel linear robot in FIG. 1, shown with fixed frame boards of a base of the 3-axis parallel linear robot removed.
Figure 5:
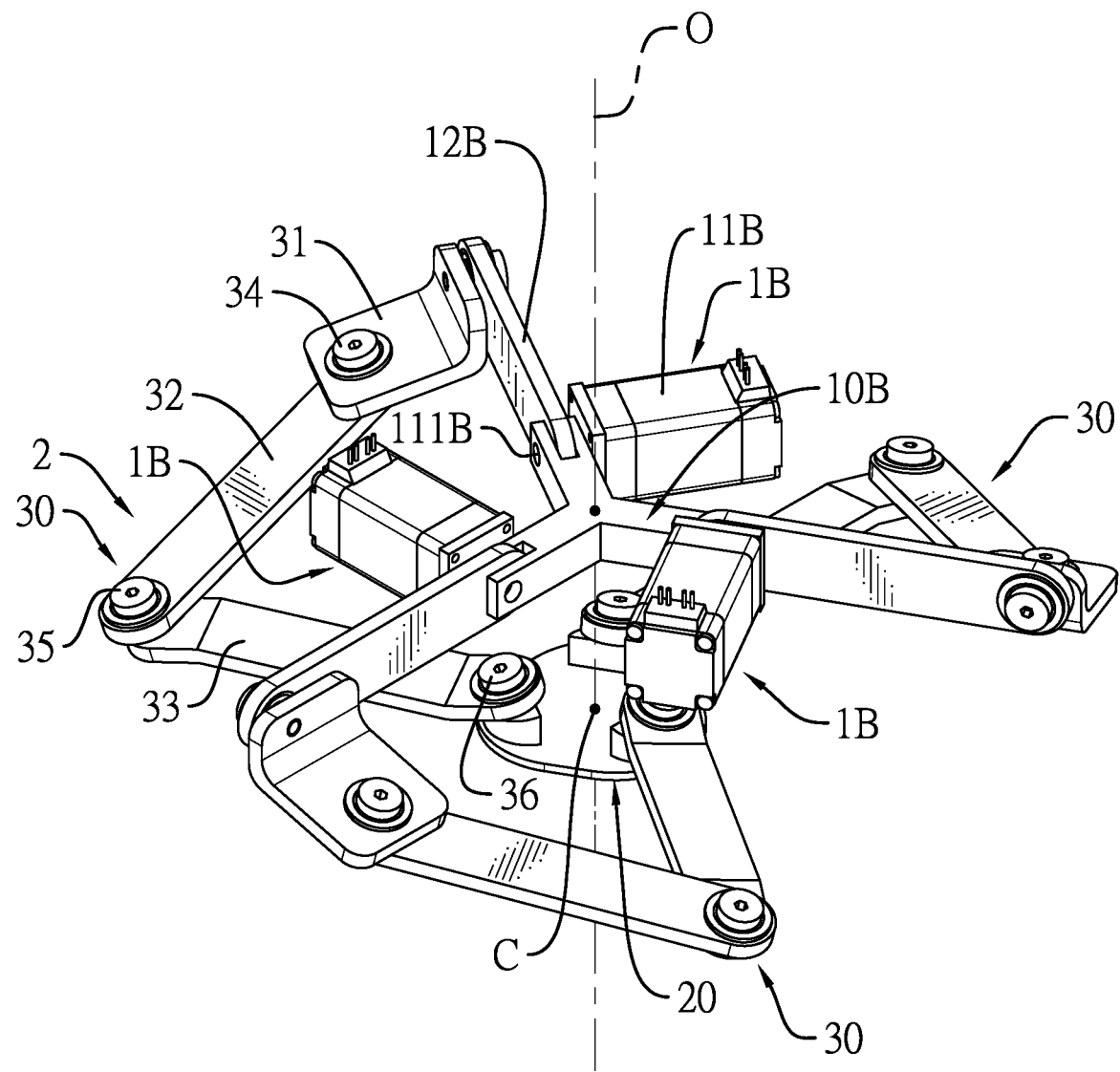
FIG. 5 is a perspective view of a second embodiment of a 3-axis parallel linear robot in accordance with the present invention.
Figure 10:
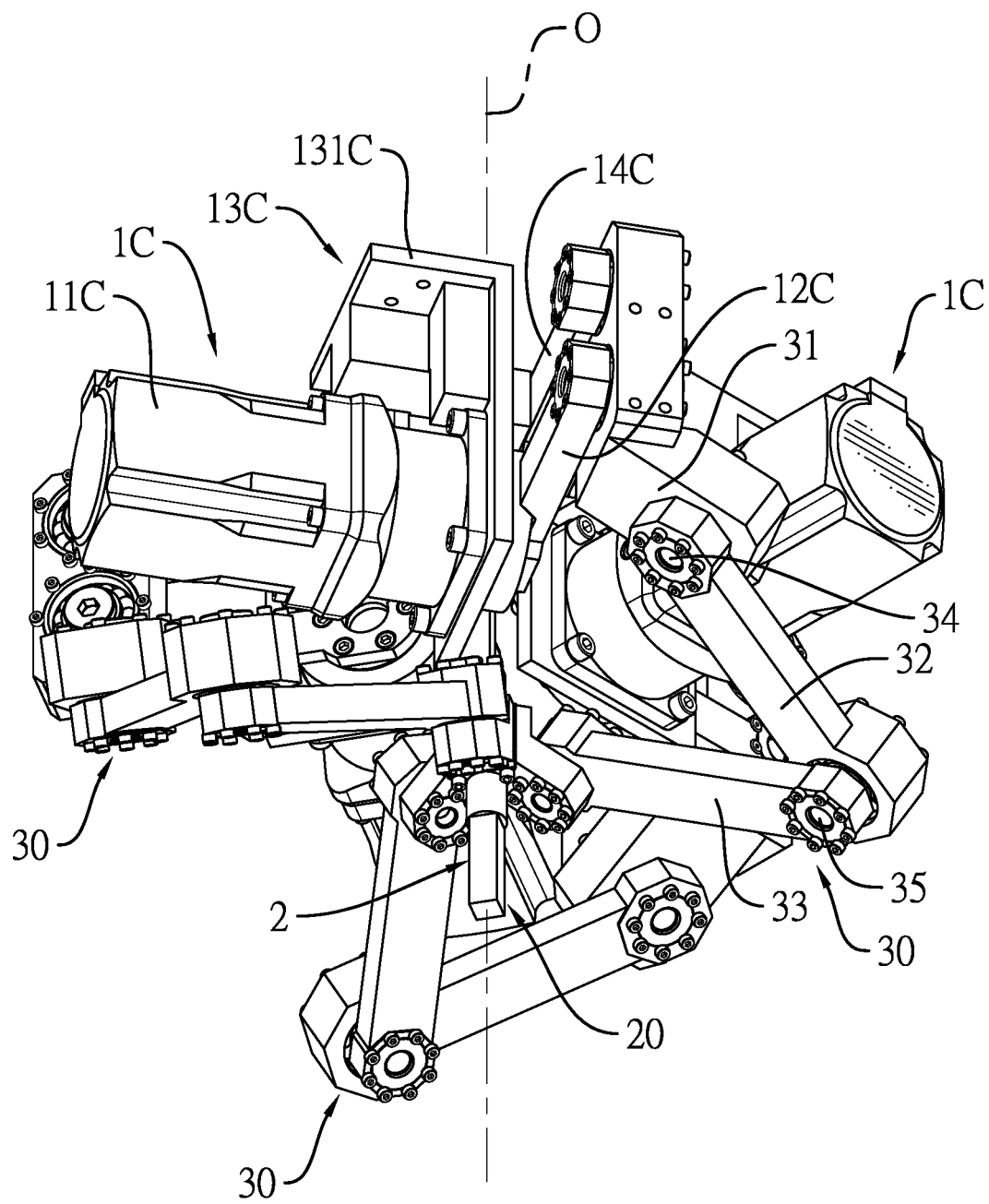
FIG. 10 is a perspective view of a third embodiment of a 3-axis parallel linear robot in accordance with the present invention.
Figure 11:
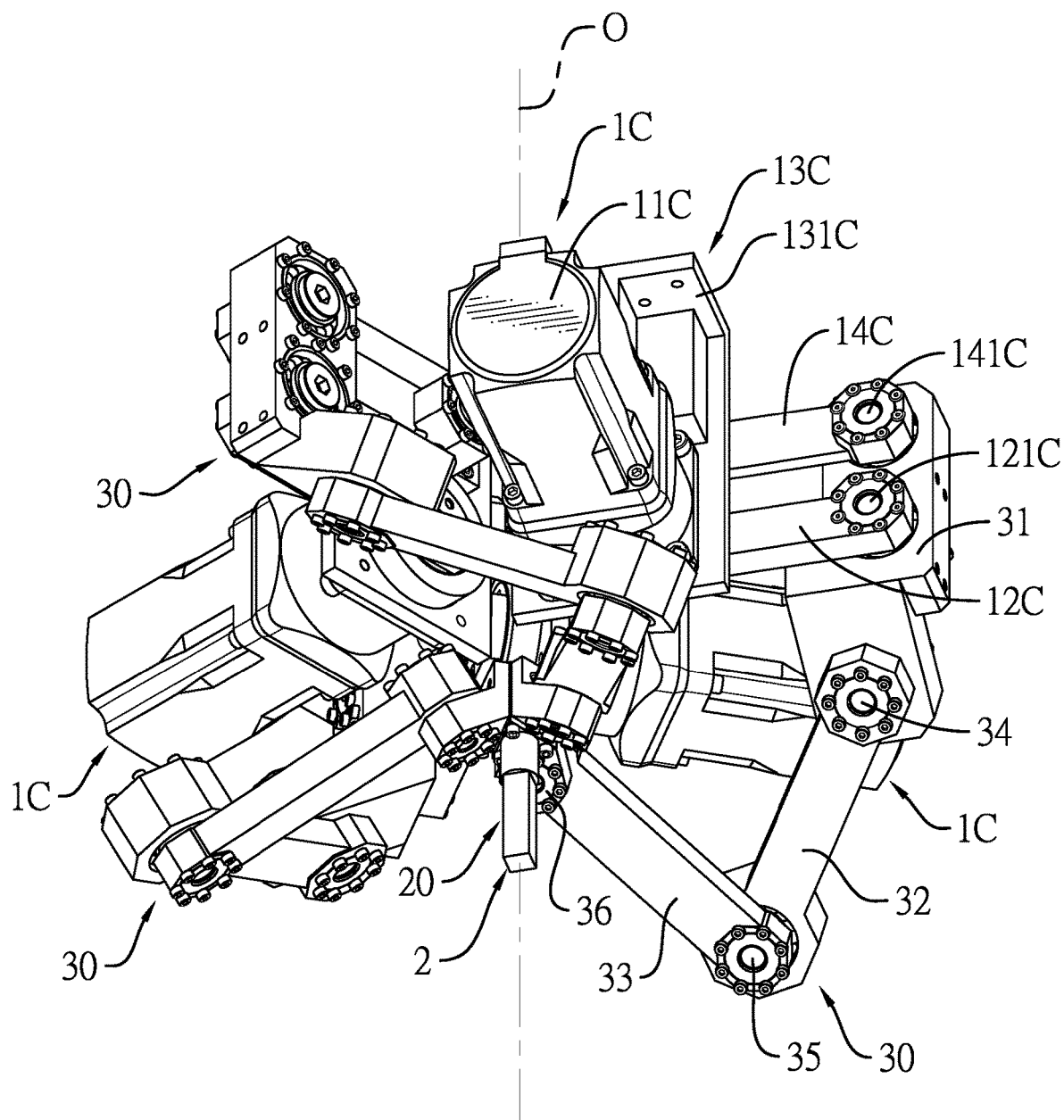
FIG. 11 is another perspective view of the 3-axis parallel linear robot in FIG. 10.
Figure 12:
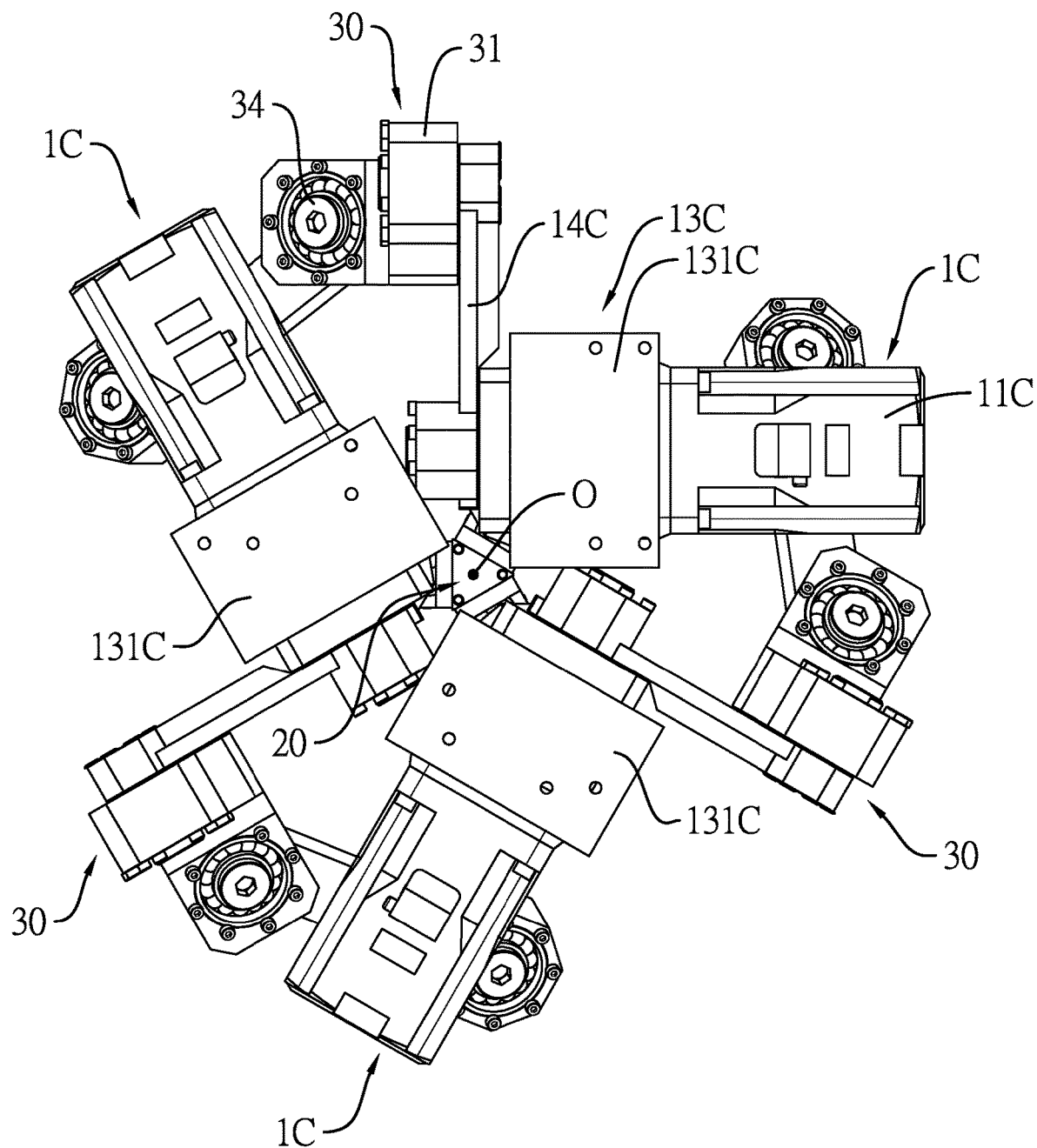
FIG. 12 is a top side view of the 3-axis parallel linear robot in FIG. 10.
Figure 13:
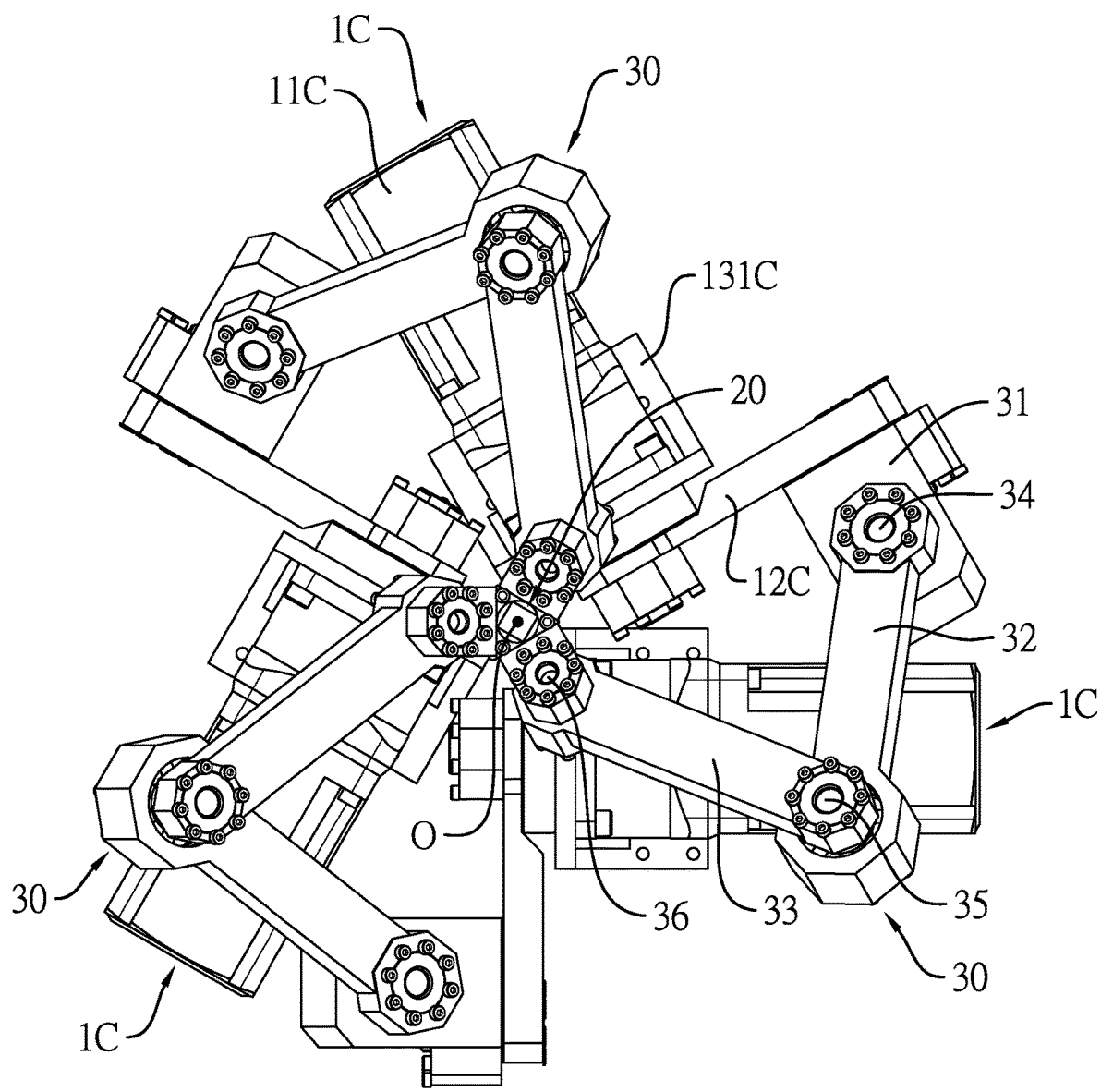
FIG. 13 is a bottom side view of the 3-axis parallel linear robot in FIG. 10.
Figure 14:
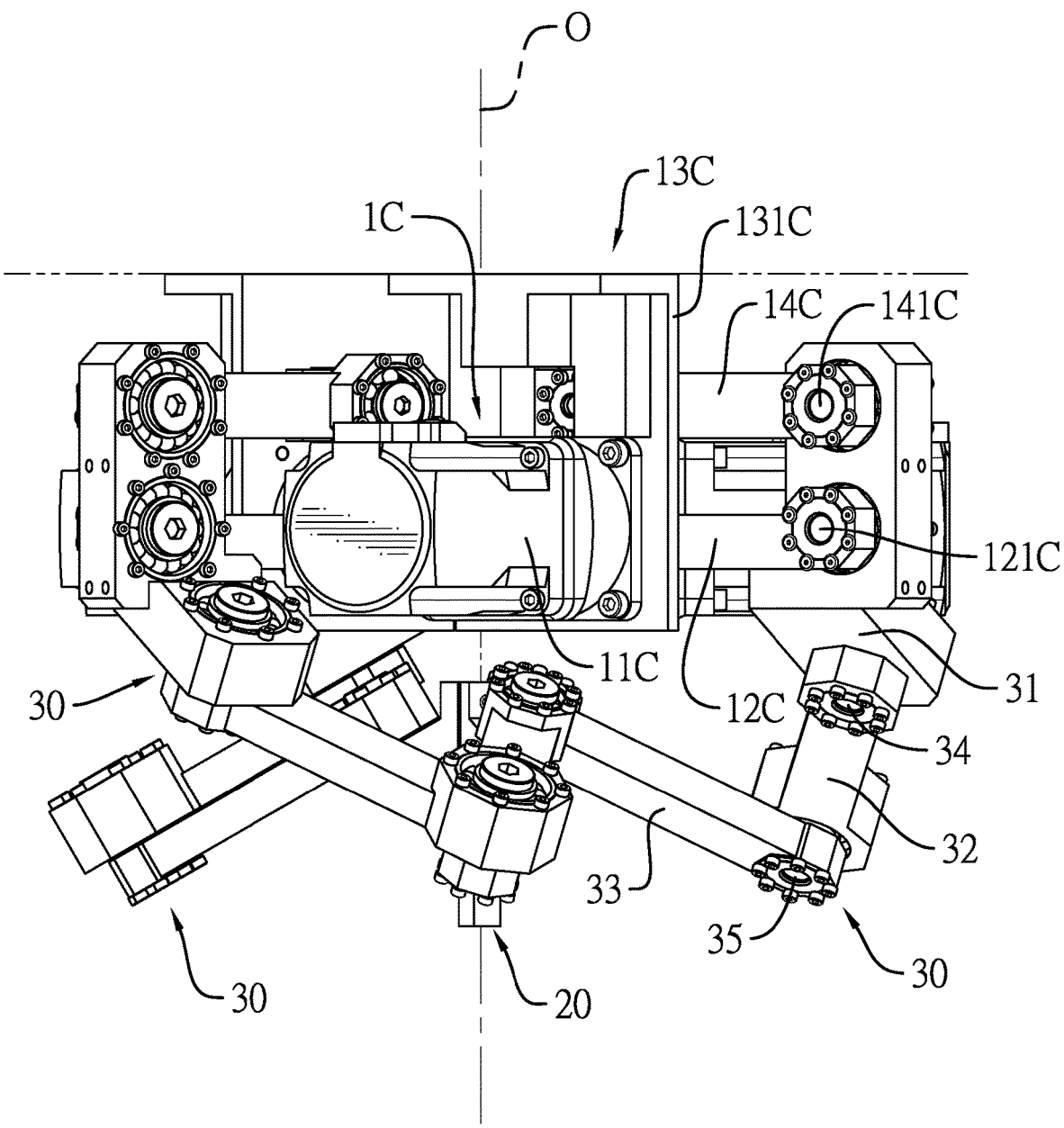
FIG. 14 is a side view of the 3-axis parallel linear robot in FIG. 10.
Figure 15:
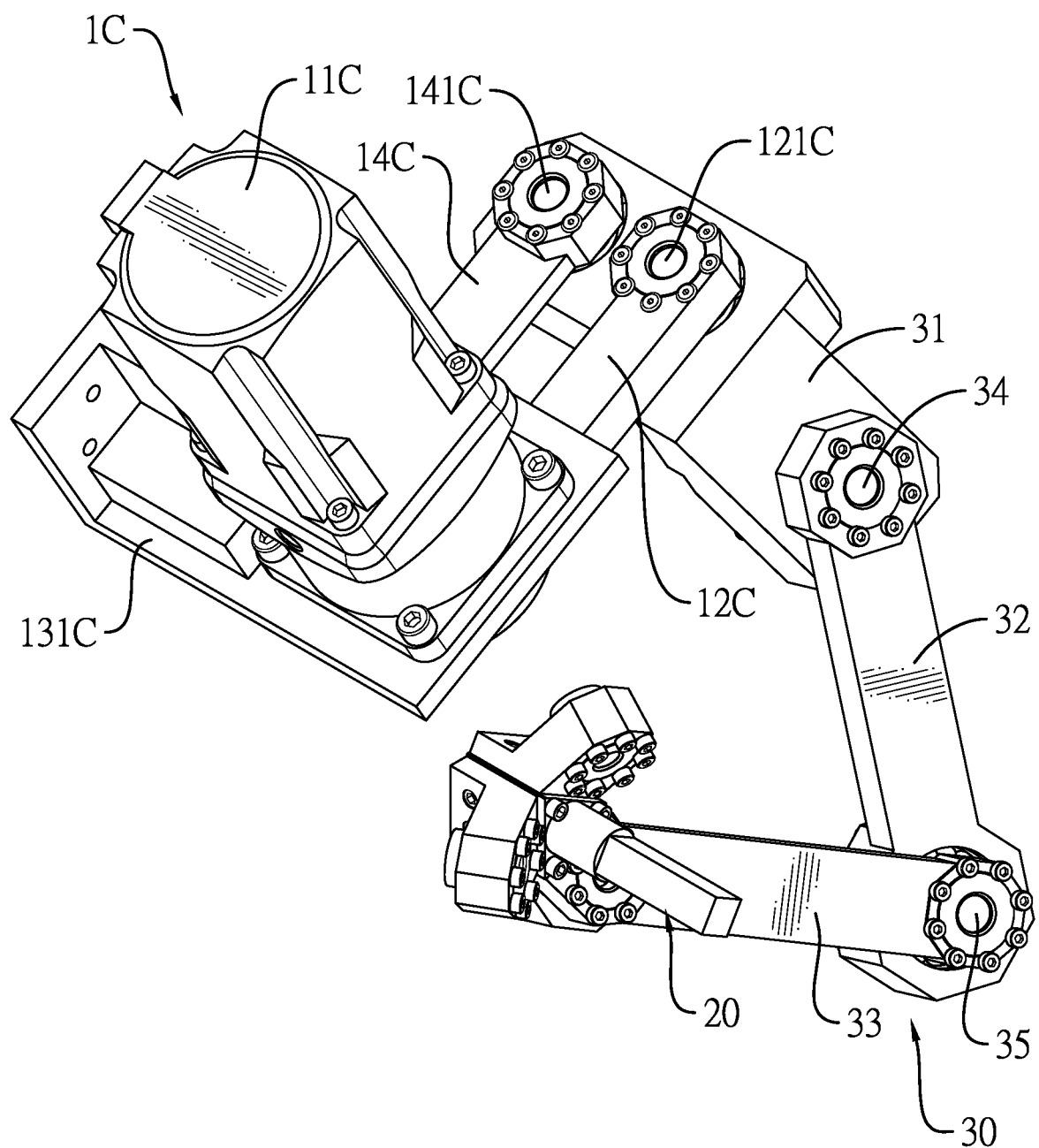
FIG. 15 is an enlarged perspective view of the 3-axis parallel linear robot in FIG. 10.
Figure 16:
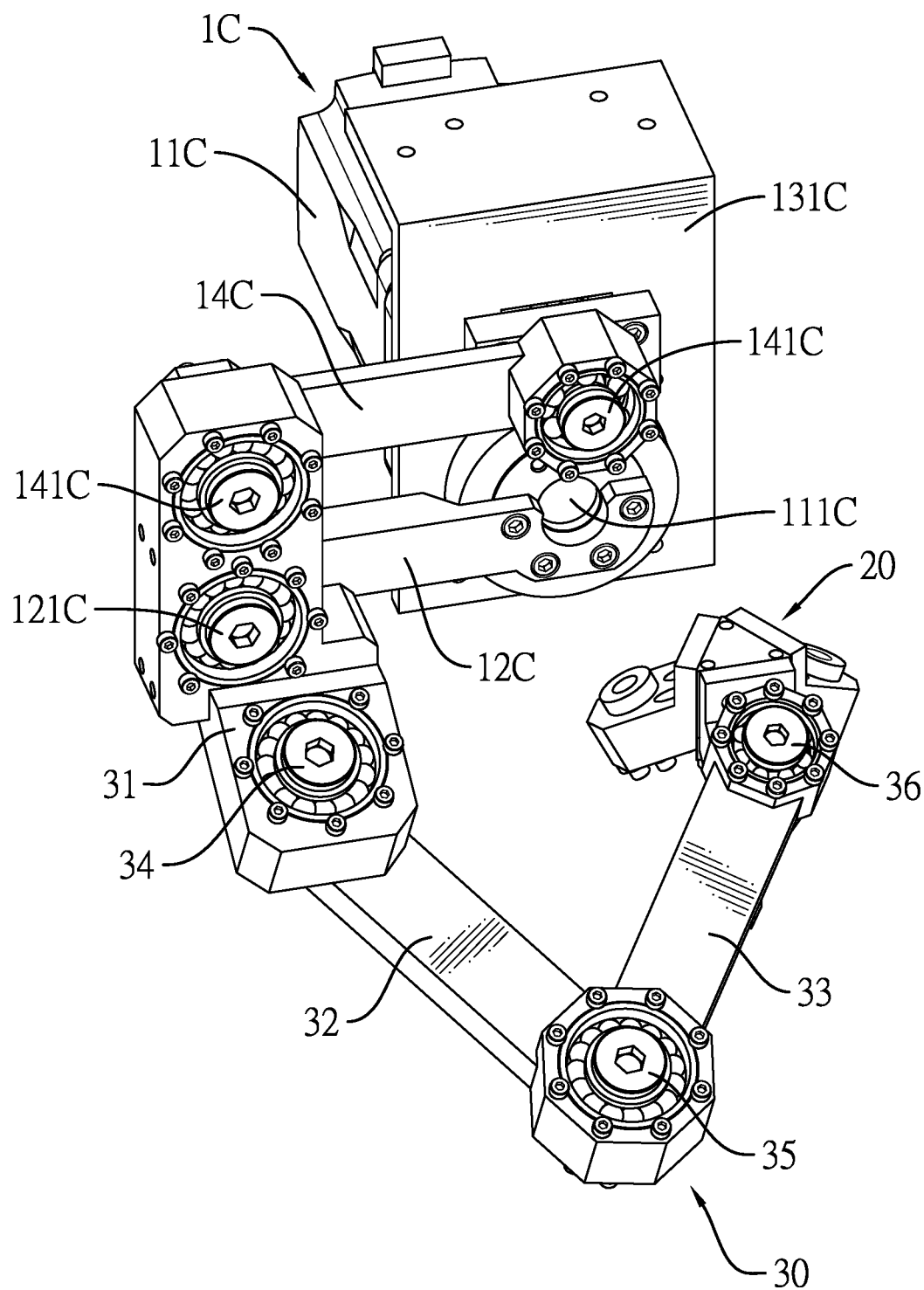
FIG. 16 is another enlarged perspective view of the 3-axis parallel linear robot in FIG. 10.

With reference to FIGS. 1, 5, and 10, a 3-axis parallel linear robot in accordance with the present invention has three embodiments, and the 3-axis parallel linear robot has a workspace W, a central axis O passing through a geometric center of the workspace W, three drivers 1A, 1B, 1C, and a movement mechanism 2.

With reference to FIGS. 1, 5, and 10, the three drivers 1A, 1B, 1C are disposed around the central axis O of the 3-axis parallel linear robot and input driving force in a linear or rotating manner. The structures and types of the three drivers can be presented in the three embodiments of the present invention.

Figure 3:
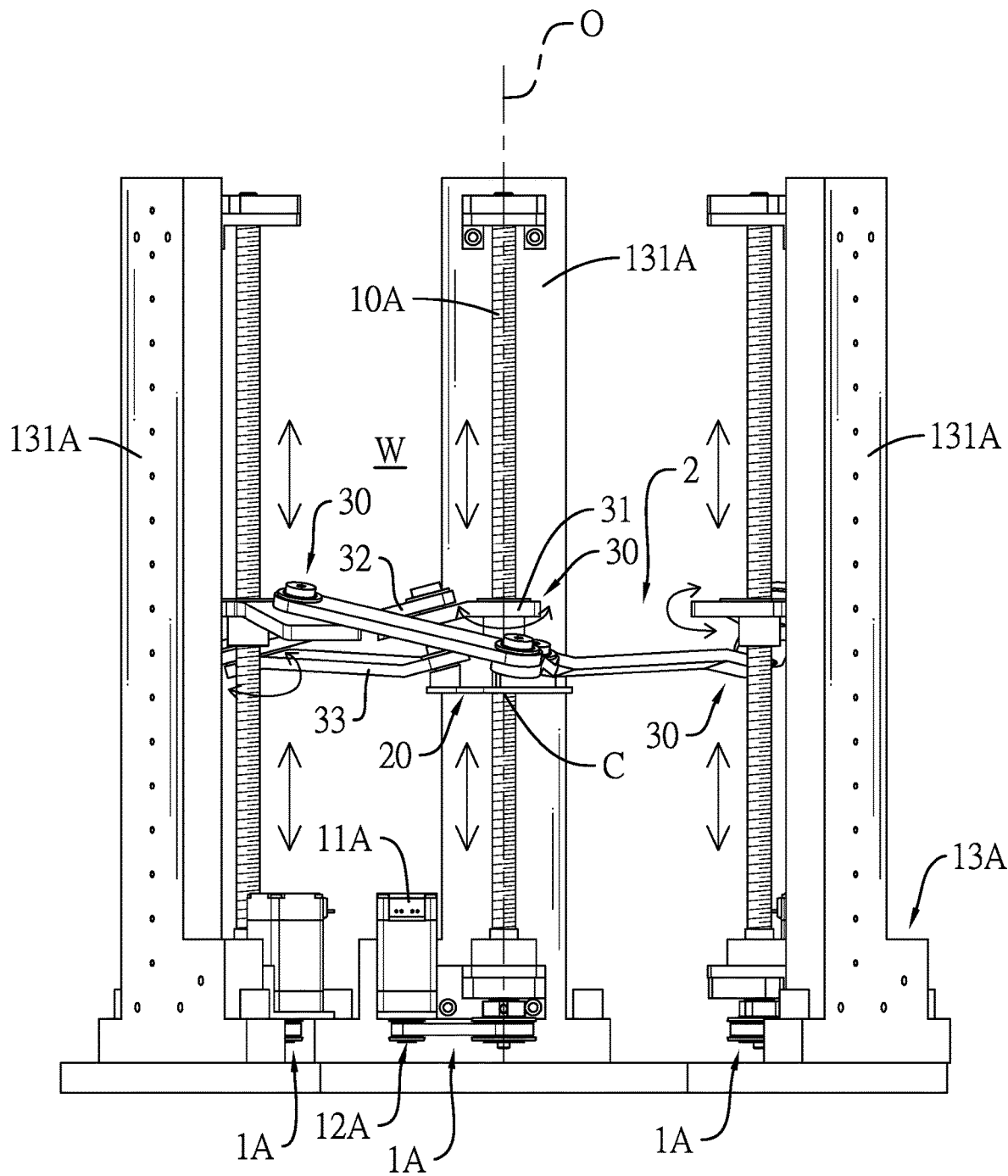
FIG. 3 is a side view of the 3-axis parallel linear robot in FIG. 1.
Figure 4:
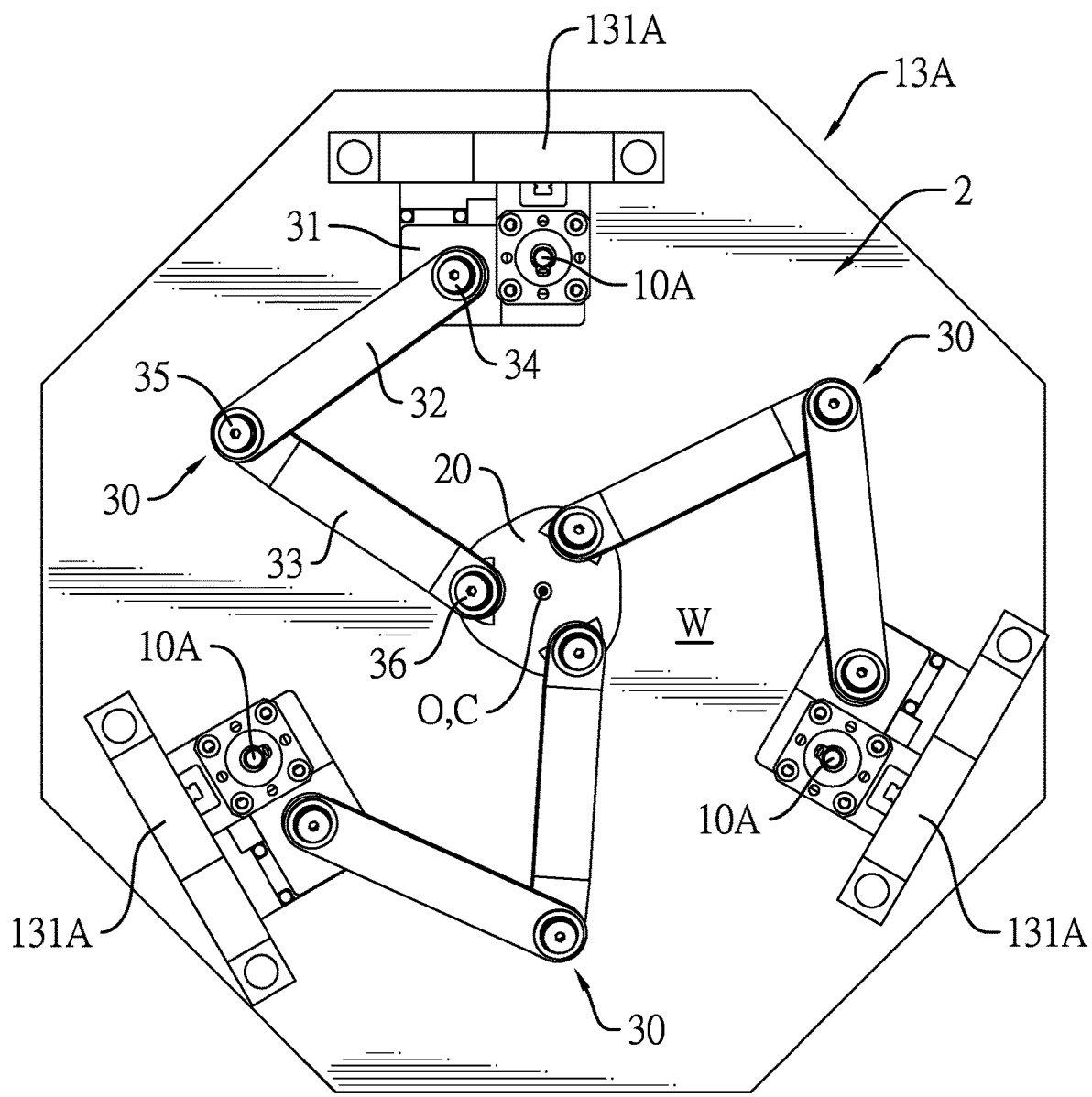
FIG. 4 is a top side view of the 3-axis parallel linear robot in FIG. 1.
Figure 8:
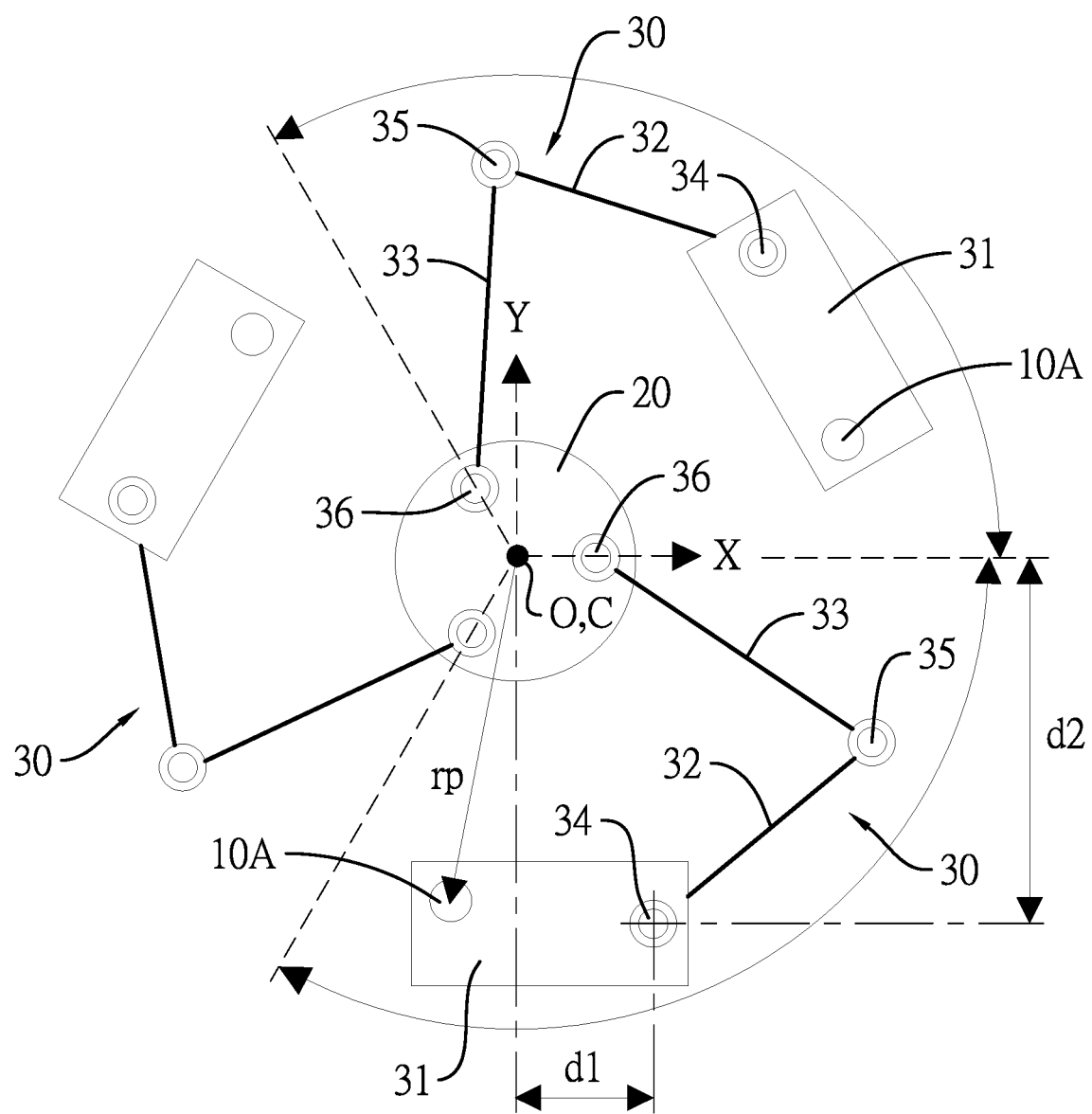
FIG. 8 is an operational top side view of a movement mechanism of the 3-axis parallel linear robot in FIG. 5.
Figure 9:
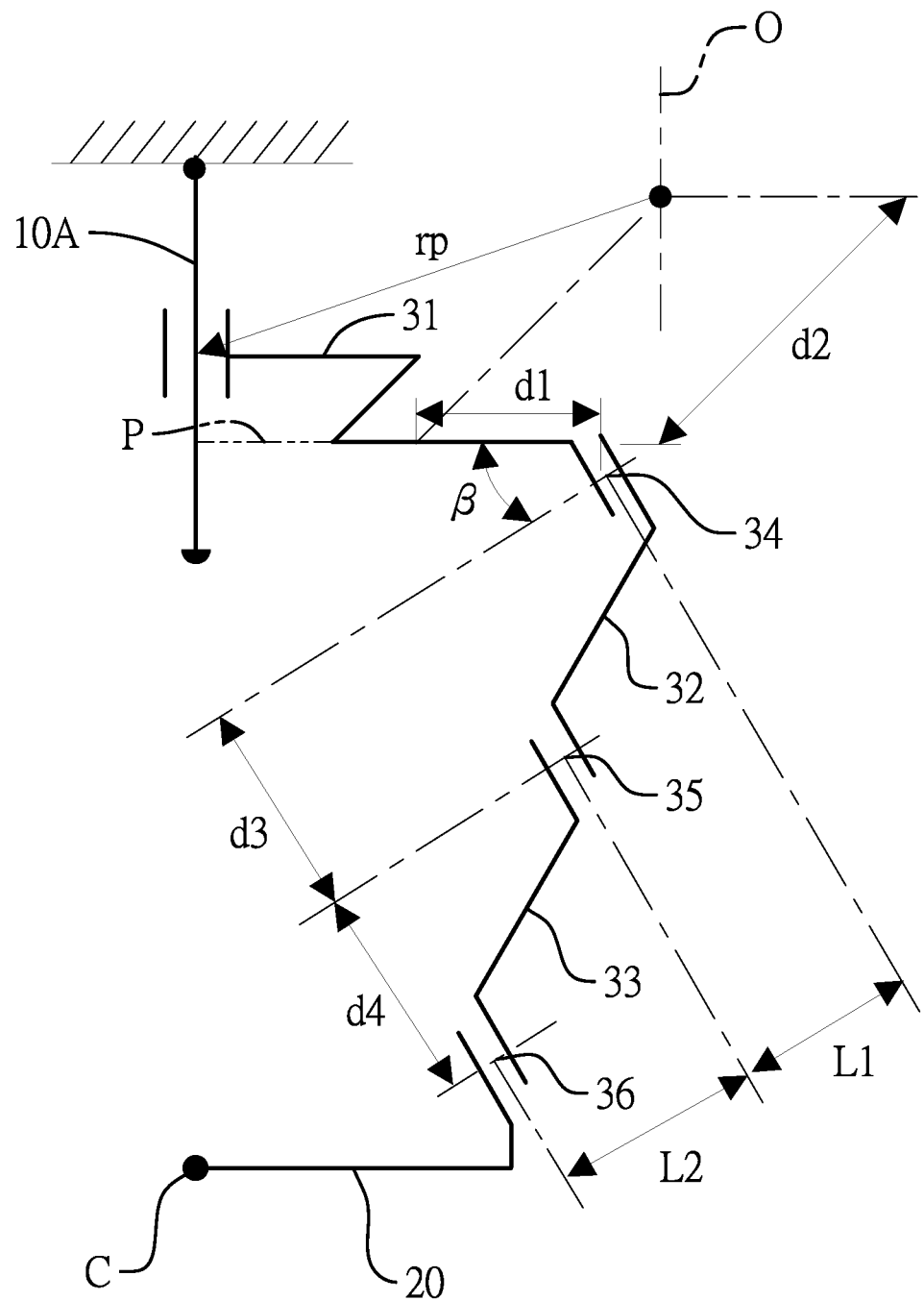
FIG. 9 is an operational side view of a linkage assembly and an end effector of the movement mechanism of the 3-axis parallel linear robot in FIG. 1.

With reference to FIGS. 1, 3, and 4, in a first embodiment of a 3-axis parallel linear robot in accordance with the present invention, each one of the three drivers 1A has a spindle 10A, a servo motor 11A, and a transmission assembly 12A. With further reference to FIGS. 8 and 9, the spindles 10A of the three drivers 1A are parallel to the central axis O and are disposed around the central axis O in an equiangular distribution. That is, each spindle 10A has a distance rp (rp≠0) relative to the central axis O. The servo motor 11A is disposed on a side of the spindle 10A and has a shaft. The transmission assembly 12A is connected to the shaft of the servo motor 11A and an end of the spindle 10A, and is connected to the movement mechanism 2 via the spindle 10. The three drivers 1A input driving force in a linear manner to together drive the movement mechanism 2 to move linearly. The transmission assembly 12A can be selected from timing pulley group, gear group or other equivalent transmission assembly.

With reference to FIGS. 1, 3, and 4, in the first embodiment of the 3-axis parallel linear robot, the 3-axis parallel linear robot further has a base 13A, and the base 13A has three fixed frame boards 131A. Each one of the three drivers 1A is disposed on a respective one of the three fixed frame boards 131A of the base 13A.

Figure 6:
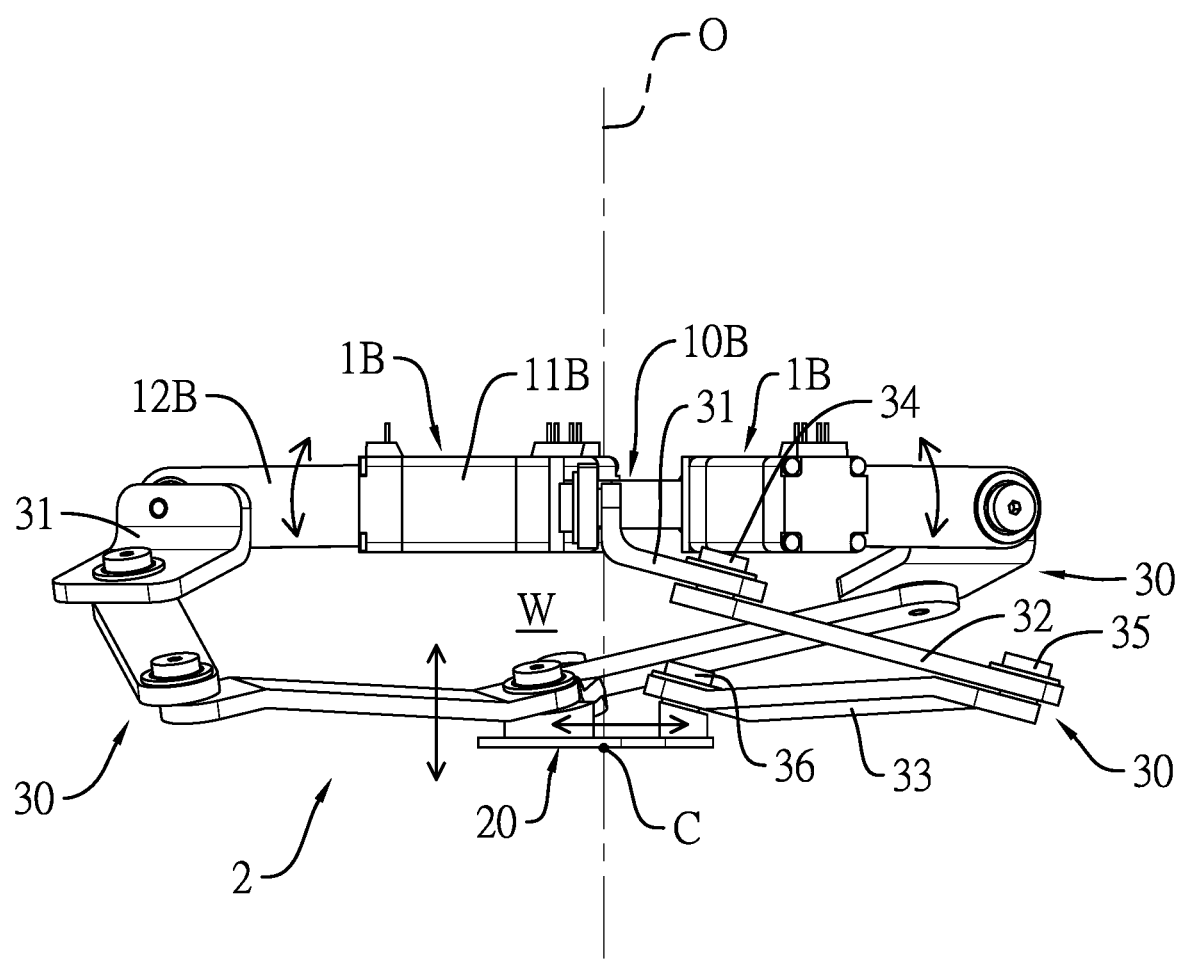
FIG. 6 is side view of the 3-axis parallel linear robot in FIG. 5.
Figure 7:
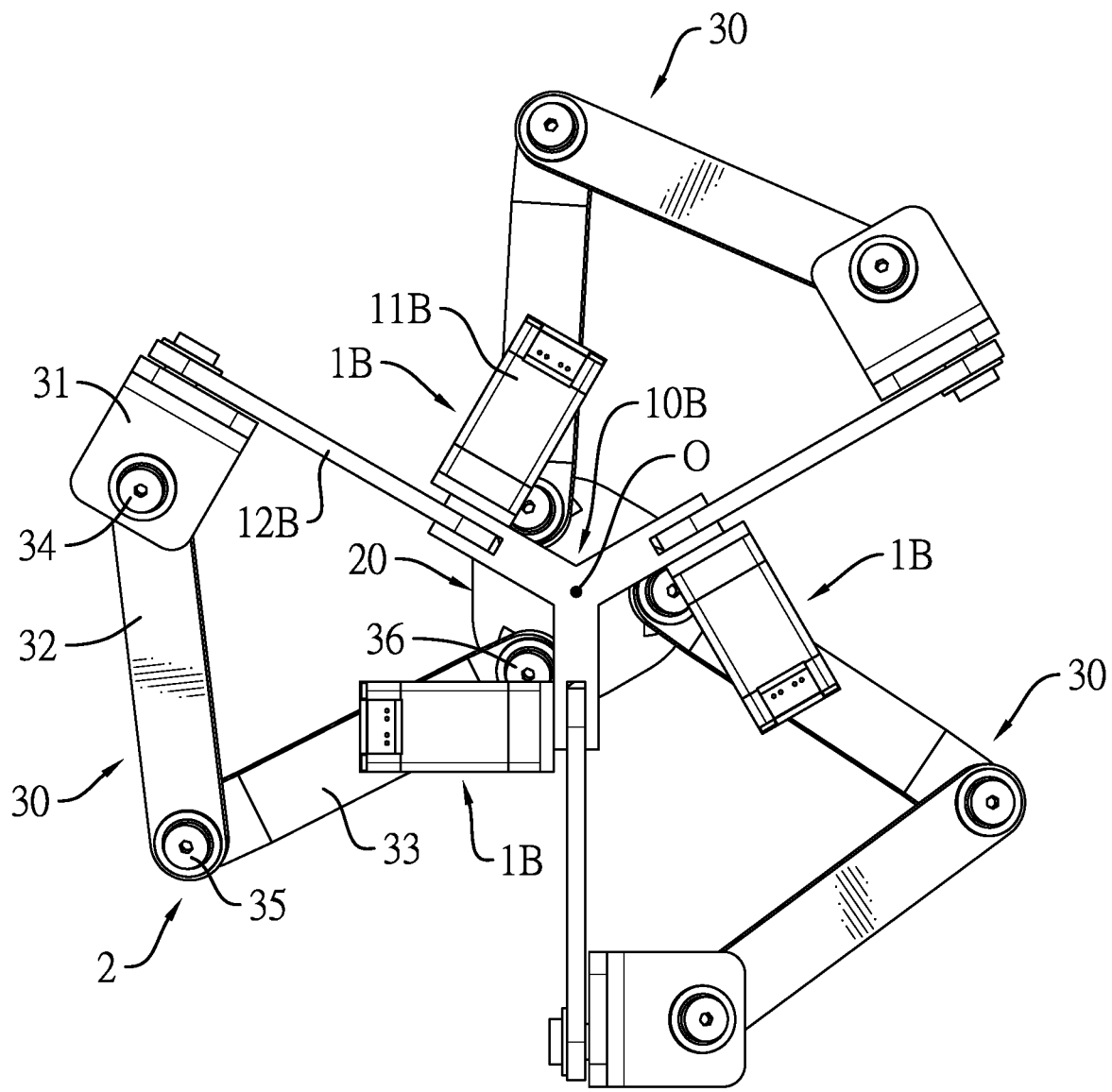
FIG. 7 is a top side view of the 3-axis parallel linear robot in FIG. 5.

With reference to FIGS. 5 to 7, in a second embodiment of a 3-axis parallel linear robot in accordance with the present invention, the three drivers 1B are disposed on a fixed frame 10B in rotational symmetry. The central axis O passes through a geometric center of the fixed frame 10B. Each one of the three drives 1B has a servo motor 11B and a drive arm 12B. The servo motor 11B is securely mounted to the fixing frame 10B and has a shaft 111B. The drive arm 12B has two ends, one of the two ends is securely connected to the shaft 111B of the servo motor 11B, and the other one of the two ends of the drive arm 12B is connected to the movement mechanism 2. The three drivers 1B can input driving force in a rotating manner to together drive the movement mechanism 2 to move in a linear motion.

With reference to FIGS. 10 to 16, in a third embodiment of a 3-axis parallel linear robot in accordance with the present invention, the three drivers 1C are disposed on a fixed structure 13C in rotational symmetry relative to the central axis O. The fixed structure 13C may be a single component or has three fixing mounts 131C, and each one of the three drivers 1C is disposed on a respective one of the three fixing mounts 131C.

Each one of the three drivers 1C has a servo motor 11C, a drive arm 12C, and an auxiliary arm 14C. The servo motor 11C is disposed on one of the three fixing mounts 131C and has a shaft 111C. The drive arm 12C has two ends, one of the two ends is securely connected to the shaft 111C of the servo motor 11C, and the other one of the two ends of the drive arm 12C is connected to the movement mechanism 2. The auxiliary arm 14C is parallel with the drive arm 12C and has two ends, one of the two ends is rotatably connected to the fixed structure 13C, and the other one of the two ends is connected to the movement mechanism 2. The three drivers 1C can input driving force in a rotating manner to together drive the movement mechanism 2 to move in a linear motion, and a parallel linking group that is composed by the drive arm 12C and the auxiliary arm 14C can improve the stability of the linear motion of the movement mechanism 2 by the three drivers 1C together.

With reference to FIGS. 1 to 4, 5 to 7, and 10 to 11, the movement mechanism 2 is co-driven by the three drivers 1A, 1B, 1C and has an end effector 20 and three linkage assemblies 30. A geometric center C of the movement mechanism 20 is located in the workspace W of the 3-axis parallel linear robot, and the three linkage assemblies 30 are rotationally symmetrical with each other relative to the central axis O and are connected to the end effector 20 in parallel. Each one of the linkage assemblies 30 is driven by a respective one of the three drivers 1A, 1B, 1C, so that the end effector 20 can be driven to move linearly in a three-dimensional space.

With reference to FIGS. 1 to 4, 5 to 7, and 10 to 11, and further FIGS. 8 and 9, each one of the three linkage assemblies 30 of the movement mechanism 2 has a first linkage rod 31, a second linkage rod 32, and a third linkage rod 33. The first linkage rod 31 has two ends, one of the two ends is connected to the corresponding driver 1A, 1B, 1C, and the other one of the two ends is pivotally connected to one of two ends of the second linkage rod 32 by a first rotating joint 34. The other one of the two ends of the second linkage rod 32 is pivotally connected to one of two ends of the third linkage rod 33 by a second rotating joint 35. The other one of the two ends of the third linkage rod 33 is pivotally connected to the end effector 20 by a third rotating joint 36. The first rotating joint 34, the second rotating joint 35, and the third rotating joint 36 are all rotating parts of a single rotating central axis, such as bearings. Additionally, the rotating central axes of the first rotating joint 34, the second rotating joint 35, and the third rotating joint 36 are parallel with each other. The intersection of a closed motion trajectory range of the geometric center C of the end effector 20 is generated and driven by the three linkage assemblies 30 to form the workspace W.

With reference to FIGS. 8 and 9, an inner angle β defined between the first rotating joint 34 and an imaginary plane P being perpendicular to the central axis O is an acute angle. The first rotating joint 34 has a distance d1 relative to a y-axis normal line passing through the central axis O, a distance d2 relative to an x-axis normal line passing through the central axis O, a first center distance d3 defined between the first rotating joint 34 and the second rotating joint 35, and a second center distance d4 defined between the second rotating joint 35 and the third rotating joint 36. The first center distance d3 is equal to the second center distance d4.

Furthermore, with reference to FIG. 9, the second linkage rod 32 of each linkage assembly 30 has a length L1 defined between the two ends of the second linkage rod 32 in a direction perpendicular to the first rotating joint 34 of the linkage assembly 30. The third linkage rod 33 of each linkage assembly 30 has a length L2 defined between the two ends of the third linkage rod 33 in a direction perpendicular to the second rotating joint 35 of the linkage assembly 30. One of the two said lengths L1, L2 may be equal to zero, and the other said length L1, L2 may not be equal to zero. In addition, the two said lengths L1, L2 may not be equal to zero.

With reference to FIGS. 1 to 4, in the first embodiment of the 3-axis parallel linear robot, when each driver 1A has the spindle 10A, the servo motor 11A with the shaft 111A, and the transmission assembly 12A, each first linkage rod 31 has a threaded sleeve and a corresponding spindle 10A is mounted in and screwed with the threaded sleeve of the first linkage rod 31 by a thread formed on an external surface of the corresponding spindle 10A. Each driver 1A can drive a responsive first linkage rod 31 to move along a corresponding spindle 10A linearly.

With reference to FIGS. 5 to 7, in the second embodiment of the 3-axis parallel linear robot, the three drivers 1B are disposed on the fixed frame 10B in rotational symmetry, and each driver 1B has the servo motor 11B with a shaft 111B and the drive arm 12B. One of the two ends of the drive arm 12B is securely connected to the shaft 111B and the other one of the two ends of the drive arm 12B is connected to a responsive first linkage rod 31. The drive arm 12B of each driver 1B can swing to drive the corresponding first linkage rod 31 to move in a direction parallel to the central axis O.

With reference to FIGS. 10 to 16, in the third embodiment of the 3-axis parallel linear robot, when the three drivers 1C are disposed on the fixed structure 13C in rotational symmetry, each driver 1C has the servo motor 11C with the shaft 111C, the drive arm 12C, and the auxiliary arm 14C. The servo motor 11C is securely disposed on one of the three fixing mounts 131C of the fixed structure 13C, one of the two ends of the drive arm 12C is rotatably connected to a responsive first linkage rod 31, the auxiliary rod 14C is parallel with the drive arm 12C, one of the two ends of the auxiliary arm 14C is rotatably connected to the corresponding fixing mount 131C of the fixed structure 13C, and the other one of the two ends of the auxiliary arm 14C is rotatably connected to the corresponding first linkage rod 31. The drive arm 12C and the auxiliary arm 14C of each driver 1C can be driven to swing together to enable the corresponding first linkage rod 31 to move in the direction parallel to the central axis O.

In the third embodiment of the 3-axis parallel linear robot, the drive arm 12C is connected to the corresponding first linkage rod 31 by a bearing 121C, and the auxiliary arm 14C is rotatably connected to the corresponding fixing mount 131C of the fixed structure 13C by a bearing 141C and is rotatably connected to the corresponding first linkage rod 31 by a bearing 141C. With a parallel linkage assembly formed by the drive arm 12C and the auxiliary arm 14C, even if the dimensional tolerances of the bearings 121C, 141C result in a gap between the components inside the bearings 121C, 141C, the auxiliary arm 14 can still assist the drive arm 12C, and this can maintain the stability of the linear motion of the motion mechanism 2 driven by the drivers 1C.

With reference to FIGS. 3 to 4, 6 to 7, 10 to 11, and 8 to 9, regarding the movement of the 3-axis parallel linear robot in accordance with the present invention, the 3-axis parallel linear robot can use the Jacobian matrix as the vector analysis control, and then controls the three drivers 1A, 1B, and 1C to drive with linear input as shown in FIG. 1 of the first embodiment or to drive with rotary input as shown in FIGS. 5 and 10 of the second and third embodiments, etc. Then the three linkage assemblies 30 of the movement mechanism 2 can together drive the end effector 20 to move linearly in a three-dimensional space. The Jacobian matrix belongs to the prior art and will not be repeated here.

According to the above-mentioned description, the 3-axis parallel linear robot of the present invention has at least the following advantages and effects.

First, reduce overall height of the movement mechanism and increase working stroke.

The 3-axis parallel linear robot of the present invention uses the movement mechanism 2 including the three linkage assemblies 30, and each linkage assembly 30 has a first linkage rod 31, a second linkage rod 32, a third linkage rod 33, a first rotating joint 34 connected to the first linkage rod 31 and the second linkage rod 32, a second rotating joint 35 connected to the second linkage rod 32 and the third linkage rod 33, and a third rotating joint 36 connected to the third linkage rod 33 and the end effector 20. The first linkage rod 31, the second linkage rod 32, and the third linkage rod 33 are sequentially connected in series. Each one of the rotating joints 34, 35, 36 is a rotating part of a single rotating central axis, and the inner angle defined between each one of the rotating joints 34, 35, 36 and an imaginary plane P being perpendicular to the central axis O is an acute angle. The rotating central axes of the first rotating joint 34, the second rotating joint 35, and the third rotating joint 36 are parallel with each other. The first center distance d3 defined between the first rotating joint 34 and the second rotating joint 35 is equal to the second center distance d4 defined between the second rotating joint 35 and the third rotating joint 36. According to the above-mentioned features and structural relationships, the overall structure of the movement mechanism 2 of the present invention can be flattened to reduce the overall height of the movement mechanism 2 and to increase the working stroke. Under the condition of the same workspace W of the end effector 20, the overall height of the 3-axis parallel linear robot of the present invention is approximately less than half of the overall height of the conventional Delta robot and less than the overall height of the conventional right angle type parallel robot, and this enables the 3-axis parallel linear robot of the present invention to save space and have a large working stroke.

Second, relationship between speed and power transmission is consistent.

According to the above-mentioned features and structural relationships of the present invention, the 3-axis parallel linear robot uses the Jacobian matrix as the vector analysis control, the three drivers 1A, 1B, 1C can be selected from linear input type or rotary input type to drive the movement mechanism 2, and this may make the Jacobian matrix a constant value (linear input type) or close to the constant value (rotary input type). Then the relationship between the speed and the power transmission of the end effector 20 of the 3-axis parallel linear robot can be consistent, and the design of motion control of the 3-axis parallel linear robot of the present invention is easier.

Third, increase output speed.

Since the overall height of the flattened motion mechanism 2 of the 3-axis parallel linear robot of the present invention is small, the distance from an input drive end to the end effector 20 is relatively short, and the relationship between the speed and the power transmission is consistent, under the condition of same input speed, the output speed of the 3-axis parallel linear robot of the present invention is faster, which is about twice the output speed of the conventional Delta robot.

Fourth, improve movement stability.

The number of the linkage rods 31, 32, 33 of the linkage assemblies 30 of the movement mechanism 2 of the 3-axis parallel linear robot of the present invention is less, and the 3-axis parallel linear robot uses the rotating joints 34, 35, 36 as the pivot components. Then the overall rigidity and the wear resistance of the 3-axis parallel linear robot are better, and the gap between the components of the 3-axis parallel linear robot is small. Furthermore, the flattened structure of the movement mechanism 2 makes the 3-axis parallel linear robot of the present invention have a small overall height, so that the movement stability of the 3-axis parallel linear robot can be effectively improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A 3-axis parallel linear robot comprising:
   a workspace;
   a central axis passing through a geometric center of the workspace;
   three drivers disposed around the central axis; and
   a movement mechanism co-driven by the three drivers and having
   an end effector having a geometric center located in the workspace; and
   three linkage assemblies rotationally symmetrical with each other relative to the central axis and connected to the end effector in parallel, each one of the linkage assemblies driven by a respective one of the three drivers, the end effector driven to move linearly in a three-dimensional space, and each one of the linkage assemblies having
   a first linkage rod;
   a second linkage rod; and
   a third linkage rod;
   wherein the first linkage rod of each linkage assembly has two ends, one of the two ends of the first linkage rod is connected to one of the three drivers, the other one of the two ends of the first linkage rod is pivotally connected to one of two ends of the second linkage rod by a first rotating joint, the other one of the two ends of the second linkage rod is pivotally connected to one of two ends of the third linkage rod by a second rotating joint, the other one of the two ends of the third linkage rod is pivotally connected to the end effector by a third rotating joint, and an intersection of a closed motion trajectory range of the geometric center of the end effector is generated and driven by the three linkage assemblies to form the workspace;
   wherein an inner angle defined between the first rotating joint of each linkage assembly and an imaginary plane being perpendicular to the central axis is an acute angle, and rotating central axes of the first rotating joint, the second rotating joint, and the third rotating joint of each linkage assembly are parallel with each other;
   wherein a first center distance is defined between the first rotating joint and the second rotating joint of each linkage assembly, a second center distance is defined between the second rotating joint and the third rotating joint of each linkage assembly, and the first center distance is equal to the second center distance;

wherein the three drivers are disposed on a fixed structure in rotational symmetry relative to the central axis;

each one of the three drivers has a servo motor securely disposed on the fixed structure and having a spindle;

a drive arm having two ends, one of the two ends of the drive arm securely connected to the spindle of the servo motor, and the other one of the two ends of the drive arm rotatably connected to the first linkage rod of the responsive linkage assembly; and an auxiliary arm parallel with the drive arm, having two ends, one of the two ends of the auxiliary arm rotatably connected to the fixed structure, and the other one of the two ends of the auxiliary arm rotatably connected to the first linkage rod of the responsive linkage assembly;

wherein the drive arm and the auxiliary arm of each driver are driven to swing together to enable the first linkage rod of the responsive linkage assembly to move in a direction parallel to the central axis.

2. The 3-axis parallel linear robot as claimed in claim 1, wherein the second linkage rod of each linkage assembly has a length defined between the two ends of the second linkage rod in a direction perpendicular to the first rotating joint of the linkage assembly;

the third linkage rod of each linkage assembly has a length defined between the two ends of the third linkage rod in a direction perpendicular to the second rotating joint of the linkage assembly; and one of the two said lengths is equal to zero, and the other said length is not equal to zero.

3. The 3-axis parallel linear robot as claimed in claim 1, wherein the second linkage rod of each linkage assembly has a length defined between the two ends of the second linkage rod in a direction perpendicular to the first rotating joint of the linkage assembly;

the third linkage rod of each linkage assembly has a length defined between the two ends of the third linkage rod in a direction perpendicular to the second rotating joint of the linkage assembly; and the two said lengths are not equal to zero.

* * * * *